June 9, 1931.  T. H. SOREN  1,809,735
ELECTRIC SWITCH CELL STRUCTURE
Filed Dec. 30, 1926

Inventor
Townsend H. Soren,
by
His Attorney.

Patented June 9, 1931

1,809,735

UNITED STATES PATENT OFFICE

TOWNSEND H. SOREN, OF HARTFORD, CONNECTICUT, ASSIGNOR TO GENERAL ELECTRIC COMPANY, A CORPORATION OF NEW YORK

ELECTRIC SWITCH CELL STRUCTURE

Application filed December 30, 1926. Serial No. 158,116.

My invention relates to electric switching stations and particularly to such stations in which the switches are arranged in separate cells to better isolate them one from another. An object of my invention is the provision of an improved cell structure whereby in the event of trouble in any one cell there shall be less danger of the trouble spreading to neighboring cells.

My invention will be better understood from the following description taken in connection with the accompanying drawings, and its scope will be pointed out in the appended claims.

Figure 1:
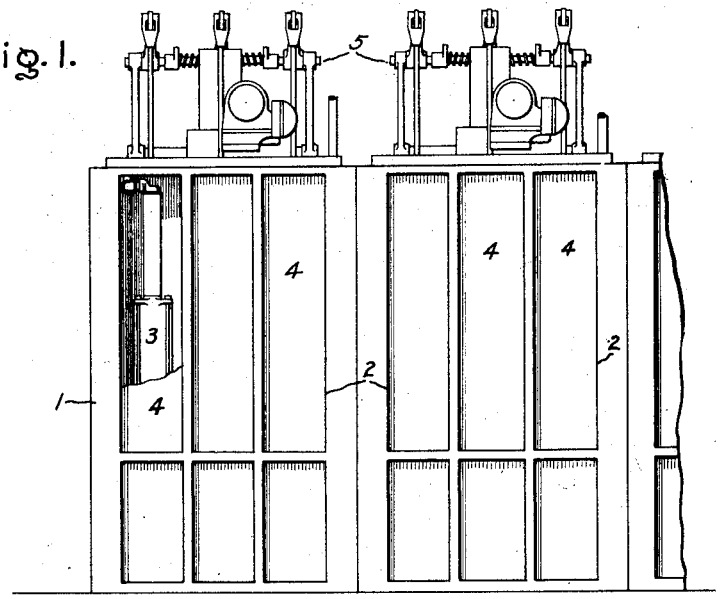
Figure 2:
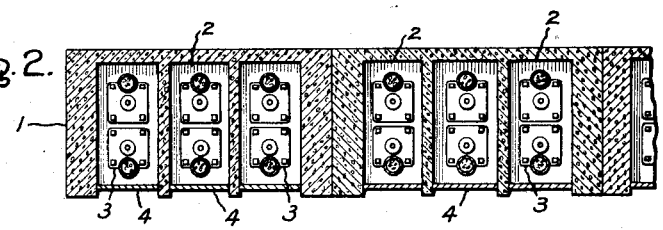
Figure 4:
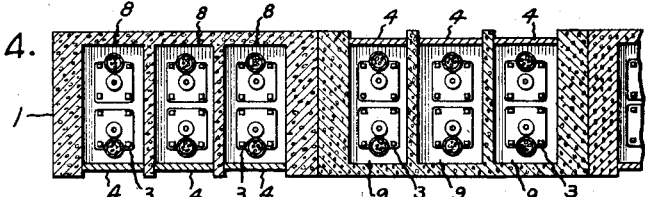
Figure 3:
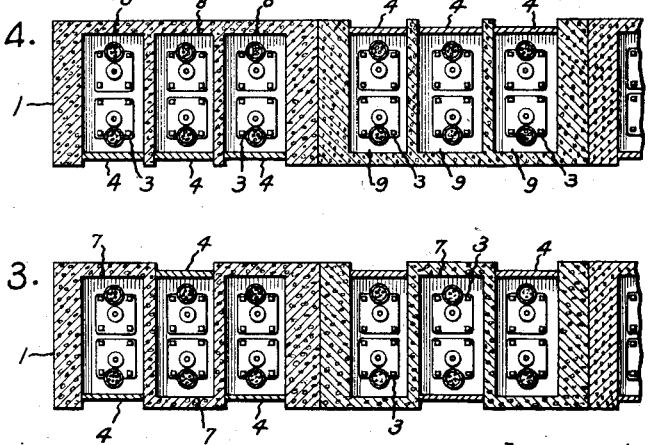

Referring to the drawings, Fig. 1 is a front elevation of a switch cell structure embodying my invention; Fig. 2 is a cross sectional view through the upper part of the structure; and Figs. 3 and 4 are similar views of modified forms of my invention.

In the drawings, the cell structure 1, in the present case illustrated as being constructed of concrete, forms a plurality of cells 2 in which are located the switches 3. The front or open sides of the cells are closed by doors 4. These doors may be hung at the top and arranged to swing out at the bottom or to swing or slide in any suitable manner. I have shown the switches by way of example arranged in groups of three, being the phase switches of a plurality of three phase circuits with the switch operating mechanisms 5 on the top of the cell structure. The cell structure for the switches of each three phase circuit may be formed as separate units and arranged side by side in a row as illustrated or the several units may all be formed as a single mass. Moreover, if desired, each cell may comprise a separate unit of itself and various other materials than that illustrated also may be employed in the construction of the cells.

Where switch cells are arranged in a row such as that illustrated and trouble occurs in a cell, such for example as the failure of the switch therein to open the circuit completely or upon the occurrence of an arc, in a cell due to an insulation breakdown, hot ionized gas in being blown from the cell may escape around the door, closing the front of the cell and enter an adjacent or neighboring cell in sufficient quantity to cause an insulation breakdown in that cell. One way in which I prevent such an occurrence is to set back the doors 4 into the cells so as to prevent the blast of hot gas from one cell passing behind and blowing open the door of a neighboring cell as may happen where the doors are secured to the front surfaces of the cells.

Another way in which I prevent direct communication of one cell with another is by constructing the cells with their front or door-covered sides arranged on opposite sides of the row of cells. In Fig. 3, for example, adjacent cells 7 are constructed with their front or door-covered sides on opposite sides of the row of cells. These cells as shown are preferably provided with doors which are set back in the cells like those of Fig. 2.

In Fig. 4 I have illustrated a modification of the arrangement shown in Fig. 3. In this case the three cells 8 containing the phase switches of one three-phase circuit open on one side of the row of cells, while the next three cells 9 containing switches of another three-phase circuit open on the opposite sides of the row and so on throughout the row. In the latter arrangement trouble in one phase even if perchance communicated to another phase of the same circuit will not be communicated to the cells containing switches of another circuit.

What I claim as new and desire to secure by Letters Patent of the United States, is—

1. A switch cell structure providing a row of adjacent cells, switches in said cells, and a door for closing each cell at one side thereof, alternate cells having their doors arranged at one side of the row and other cells having their doors arranged at the other side of the row.

2. A switch cell structure providing a row of adjacent cells, a phase switch of a plurality of polyphase circuits in each cell, and a door for closing one side of each cell, adjacent cells containing switches of different circuits having their doors arranged at opposite sides of the row, thereby to more effectively isolate the several polyphase circuits from one another.

3. A switch cell structure providing a row of adjacent cells, a phase switch of a plurality of polyphase circuits in each cell, and a door for closing one side of each cell, said doors being set back into their respective cells and the doors of neighboring cells being arranged at opposite sides of the row, thereby to more effectively isolate the several phases and circuits from one another.

In witness whereof, I have hereunto set my hand this 27th day of December, 1926.

TOWNSEND H. SOREN.